Aug. 12, 1941.    L. LEITZ ET AL    2,252,573
MOTION PICTURE CAMERA WITH EXPOSURE METER
Filed March 25, 1939    2 Sheets-Sheet 1
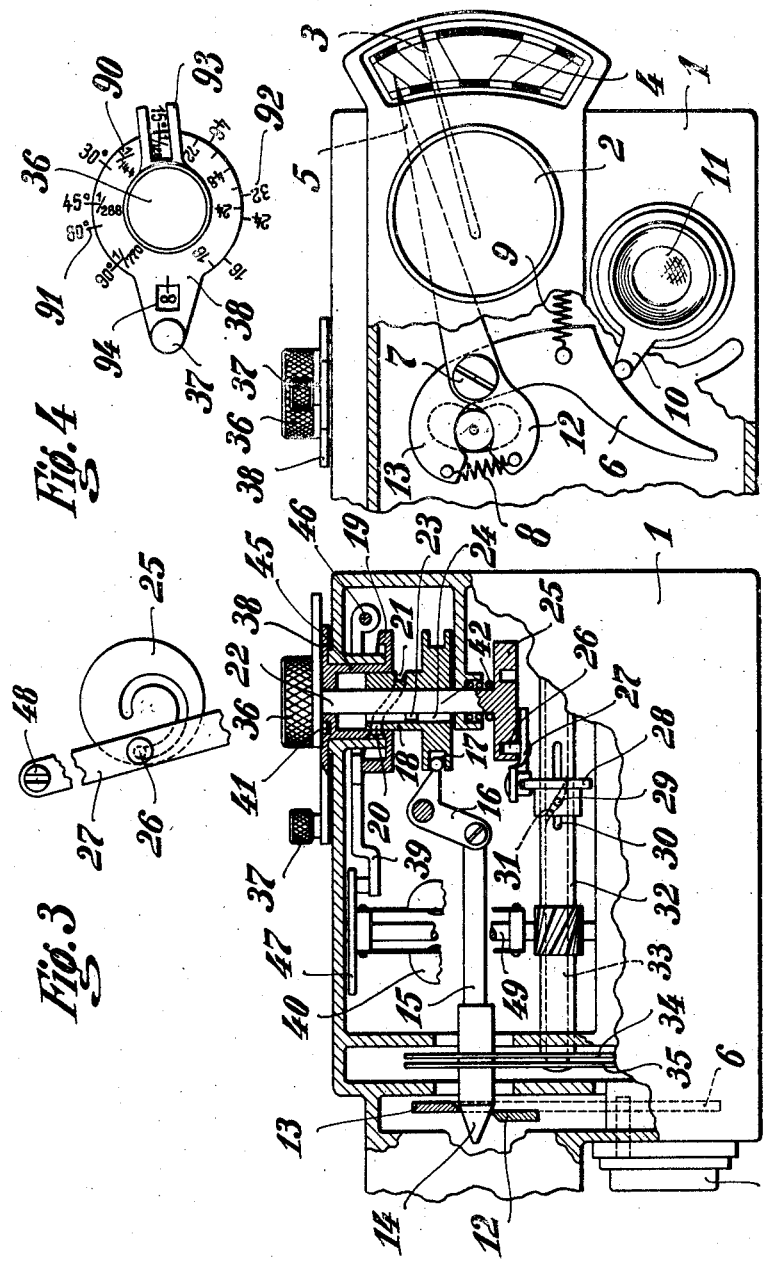
INVENTORS
Ludwig Leitz, Helmut Becker, Heinrich Broschke
BY
ATTORNEY

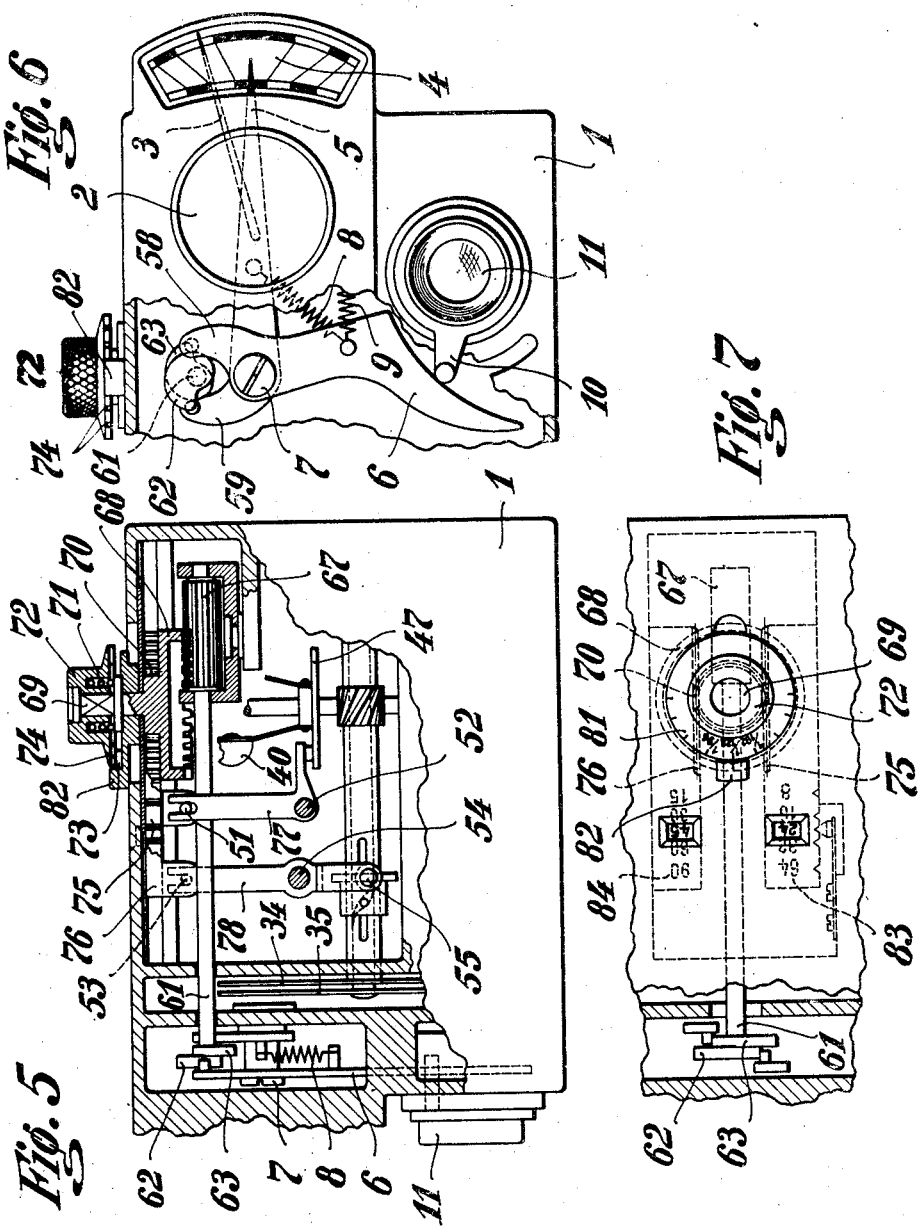

Patented Aug. 12, 1941

2,252,573

UNITED STATES PATENT OFFICE 2,252,573

MOTION PICTURE CAMERA WITH EXPOSURE METER

Ludwig Leitz, Helmut Becker, and Heinrich Broschke, Wetzlar, Germany, assignors, by mesne assignments, to Frank Dumur, Lausanne, Switzerland Application March 25, 1939, Serial No. 264,102 In Germany April 1, 1938

1 Claim. (Cl. 95—10)

This invention relates generally to improvements in motion picture cameras with exposure meters. In the art it has been proposed to connect for instance the iris diaphragm or the picture frequency governor with the photoelectric cell of the exposure meter whereby to regulate either the diaphragm or the governor. However, in a moving picture camera the light intensity may alo be varied by adjustment of the shutter sector so that also the latter must be considered. To connect these aforementioned camera elements to the photoelectric cell leads to the disadvantage that the inherently relatively weak current of the cell cannot be utilized to its full capacity for light measuring purposes.

It is the object of this invention to eliminate such disadvantages by providing a pointer which is operatively connected to the camera elements and which is caused to be moved into registry with the galvanometer needle to indicate the extent or limit to which the camera elements are to be adjusted to accord with the exposure value indicated by said needle. Another object of the invention is to provide a compact, simple and easily operated mechanism for the purposes aforesaid.

Accordingly the invention is embodied in a moving picture camera mechanism with exposure meter arranged and constructed as hereinafter set forth and as illustrated in the accompanying drawings in which Fig. 1 is a side view of so much of a motion picture camera with exposure meter according to this invention as is necessary for an understanding thereof. Parts are in section and parts broken away.

Fig. 2 is a partial front view of the camera with parts broken away and partly sectioned.

Fig. 3 is a detail view of parts shown in Fig. 1.

Fig. 4 is a detail view of certain scale elements.

Fig. 5 is a view similar to Fig. 1 but shows a modification.

Fig. 6 is a partial front view of the camera in Fig. 5 with parts in section and parts broken away.

Fig. 7 is a top view of parts of Fig. 5 with portions in section and broken away.

Referring first to Figs. 1, 2 and 3, the camera as such is marked 1. The photoelectric cell is indicated generally at 2 with the galvanometer needle 3 which moves over the usual scale 4. Suitably pivoted to the camera casing at 7 there is provided a scissor like mechanism, one leg of which is formed by the pointer 5 with a cam member 12. The other leg of the scissor is formed by a lever 6 also with a cam member 13. The lever 6 engages the diaphragm setting lever 10 of the objective 11 by means of a spring 9. The two cams 12 and 13 are by a spring 8 held in engagement with a cone point 14 upon the end of a slidable bar 15. The latter is operated by means of a bell crank 16 which in turn engages an annular groove 17 in the vertically slidable cam sleeve 18. The latter is axially slidably carried on a shutter setting shaft 22 by means of a pin 23 and groove 24.

The sleeve 18 has a cam groove 21 which is engaged by a pin 20 which in turn is carried by the rotatable sleeve 45. The latter extends upwardly outside the camera casing where it forms a scale disk 38. A knob 37 serves to rotate the sleeve 45. The latter is provided with a circular cam 19 for raising and lowering a lever 39 pivoted at 46. This lever engages the disk 47 of the governor 40 which regulates the picture frequency.

The shutter setting shaft 22 is rotated by a knob 36. At its lower end the shaft carries a grooved disk 25 which is engaged by a pin 26 in a swingable lever 27, see Fig. 3. The free end 48 of this lever engages a flanged sleeve 28. The latter has a pin 29 which engages a slot 30 in the hollow shaft 32 and a slot 31 in the inner shaft 33 whereby the shutter wings 34 and 35 are adjusted in a known manner. The shaft 32 has a worm gear for driving the governor shaft 49. The shutter setting shaft 22 is held in a normal lower position by a spring 42 and has a lug 41 which engages suitable sockets in the sleeve 45 as shown.

When a picture is to be made the photoelectric cell is aimed at the object in the usual manner and the galvanometer needle 3 then makes a deflection. Thereafter the camera elements may be adjusted by the devices described above whereby to cause a movement of the auxiliary pointer 5 until it registers with the needle 3. In this manner it is possible to adjust the camera elements until their respective positions correspond to the exposure value indicated by the galvanometer needle 3.

The scale disk 38 is provided with a time exposure scale 90 and the camera is provided with a shutter opening scale 91 and a picture frequency scale 92. The knob 36 carries a forked pointer 93. A window 94 in the scale disk shows the pictures per second at which the camera is operated.

The diaphragm opening and the speed of the shutter are the two elements which determine the exposure if we disregard the speed of the film itself. The governor regulates the picture frequency. The light intensity value indicated by the deflection of the galvanometer needle must therefore be distributed between the diaphragm and the shutter. These elements are adjusted as follows. If we start with the diaphragm because a particular focal depth is desired then the diaphragm lever 10 is moved to adjust the diaphragm opening in a well known manner and this movement is transmitted to the pointer 5 by way of the scissorslike mechanism 12—13 so that the pointer 5 is moved closer to the needle 3 after the latter has been deflected by exposure of the cell 2. Thereafter the shutter is regulated so as to use up the remaining light value. This is done by lifting the knob 36 and shaft 22 whereby to disengage the same from the sleeve 45 at 41. One may now rotate the shaft 22 independent of the sleeve 45. During such rotation the sleeve 18 is also rotated by way of the pin 23 and groove 24 whereby sleeve 18 is moved axially by way of groove 21 moving over the pin 20 so that the bell crank 16 is actuated to move the cone point 14 axially to adjust the pointer until it registers with the needle 3. Simultaneously therewith and automatically the rotation of disk 25 on shaft 22 actuates the lever 27 whereby to adjust the shutter in accordance with the extent of adjustment of the cone point. The rotation of shaft 22 therefore accomplishes two results in that the pointer 5 is brought into register with the needle 3 and in accordance therewith the shutter is adjusted. One may also rotate the sleeve 45 independent of the shaft 22. In such case the sleeve 18 is again moved axially by way of the pin 20 and groove 21 to adjust the cone point 14 and at the same time the circular cam 19 actuates the lever 39 to adjust the governor, that is the shutter speed is adjusted in accordance with the movement of the pointer 5. The adjustment of the shutter via rotation of the shaft 22 adjusts the opening between the shutter blades. The adjustment of the governor via the rotation of the sleeve 45 adjusts the speed or the length of time during which the objective is uncovered for each exposure. In both cases the shutter adjustment is in accord with the remaining movement of the pointer 5 to bring it into register with the needle 3.

Thereafter one lets go of the knob 36 which then again is coupled to the scale plate at 41 by the spring 42. The rotation of the knob 36 has not disturbed whatever frequency figure appears in the window 94 in Fig. 4. The rotation of the scale plate has caused another frequency figure to appear in said window. Be that as it may, if such figure does not indicate the correct frequency then either knob 36 or knob 37 may be grasped to rotate the scale plate whereby to cause the correct frequency figure to appear in the window 94, it being remembered that the two members 36 and 37 during such rotation are coupled together at 41 and therefore move together. This rotation will not affect the position of the cone point 14 because there is no axial movement of the sleeve 18. It will however, cause rotation of the circular cam 19, hence the speed governor will be adjusted to accord with the frequency desired. From this it will be seen that when the diaphgram and the shutter are regulated, the operation is stepwise so far as the movement of the pointer 5 is concerned whereby the shutter and diaphragm are each separately regulated in accordance with the indicated light intensity value. Incidentally and with obvious advantage a picture frequency is automatically indicated and if not correct, the governor is regulated to produce the correct frequency by operation of the same elements which are used to adjust the shutter.

Referring now to Figs. 5, 6 and 7 the same elements as in the preceding figures are marked with the same numbers. As shown in Fig. 6 the scissor like mechanism includes an arm 58 in one piece with the lever 6 and another arm 59 in one piece with the auxiliary pointer 5. The arms have pins which engage respectively two cams 62 and 63 on the end of a shaft 61 which at its other end carries a gear 67. The gear 67 engages a circular gear 68 which is carried by a short shaft 69. The latter carries in addition the shutter setting knob 72 and a smaller gear 70. The knob 72 carries a time exposure scale 81 adapted to register with an index 82. The knob is held in normal raised position by a spring 71. By depressing the knob, lugs 74 thereon engage a key 73 to lock the knob against rotation.

On opposite sides of the gear 70 there is a rack in mesh with said gear, see Fig. 7. One rack 75 engages as shown at 51 a bell crank 77 which is pivoted at 52. The bell crank engages the disk 47 of the governor 40. The other rack 76 engages as shown at 53 a lever 78 pivoted at 54 and which lever serves to adjust the shutter wings 34 and 35 by means at 55 and which are similar to the same means shown in Fig. 1.

The operation is similar to that described for Fig. 1.

In this case let it be assumed that one desires to make an exposure in accordance with a given light intensity value. Then first the knob 72 is rotated, without axial movement, until the desired exposure index on scale 81 is brought into register with the index 82. This rotation causes the pointer 5 to be moved towards the needle 3 by way of the gears 68 and 67, the shaft 61, the cams 62 and 63, and the scissor mechanism 58 and 59. Thereafter the handle 10 is operated to adjust the diaphragm on objective 11 until the two pointers register with each other. At the same time however, the rotation of knob 72 also rotates the gear 70, hence the two racks 75 and 76 have been moved and accordingly the governor 40 has been adjusted via the bell crank 77 and the shutter has been adjusted via the lever 78. The rack 75 carries a picture frequency scale 83 and the rack 76 carries a shutter opening scale 84. When the knob 72 is rotated and the racks moved as aforesaid it may happen that the scale 83 does not show the desired frequency figure. To correct this the knob 72 is depressed whereby to couple it with the key 73 to lock the knob against rotation. Thereafter the knob 72 and shaft 69 are moved laterally, the circular gear 68 sliding in the teeth on gear 67, to slide the racks until the desired frequency figure on scale 83 becomes visible. Such lengthwise movement of the racks does not influence the position of the pointer 5 because shaft 61 is not rotated thereby. Such movement will however cause further adjustment of the governor and the shutter. One may of course also proceed as explained under Fig. 3. That is the diaphragm may be adjusted at 10 to bring the pointer towards the needle. Thereafter the knob 72 is rotated, without axial movement, to adjust the shutter and governor until the two pointers register. Then the frequency may be attended to by depressing the knob and then move it and the gears carried by the shaft 69 laterally to obtain the correct frequency figure.

We claim:

In a photographic apparatus having an objective, an objective diaphragm, a rotatable shutter adjustable as to sector opening and speed of rotation, a governor for regulating the latter, means for determining the correct exposure comprising in combination a photoelectric cell with a needle actuatable thereby, an indicating pointer adapted to register with said needle to indicate correct exposure, diaphragm adjustment means, shutter sector adjustment means, governor adjustment means, mechanism operatively connecting said diaphragm adjustment means with said pointer to move the latter a distance towards the deflected needle to indicate the adjusted value of said diaphragm, a coupling member for selectively operatively connecting said pointer with the shutter sector adjustment means or with the governor adjustment means and means for manually actuating said coupling member to move said pointer an additional distance into registry with said needle and simultaneously therewith to adjust either the shutter or the governor to accord with the adjusted value of a diaphragm.

LUDWIG LEITZ.
HELMUT BECKER.
HEINRICH BROSCHKE.